May 20, 1947.　　　G. L. RIGGINS　　　2,420,725
COUPLING
Filed Aug. 11, 1944　　　2 Sheets-Sheet 2
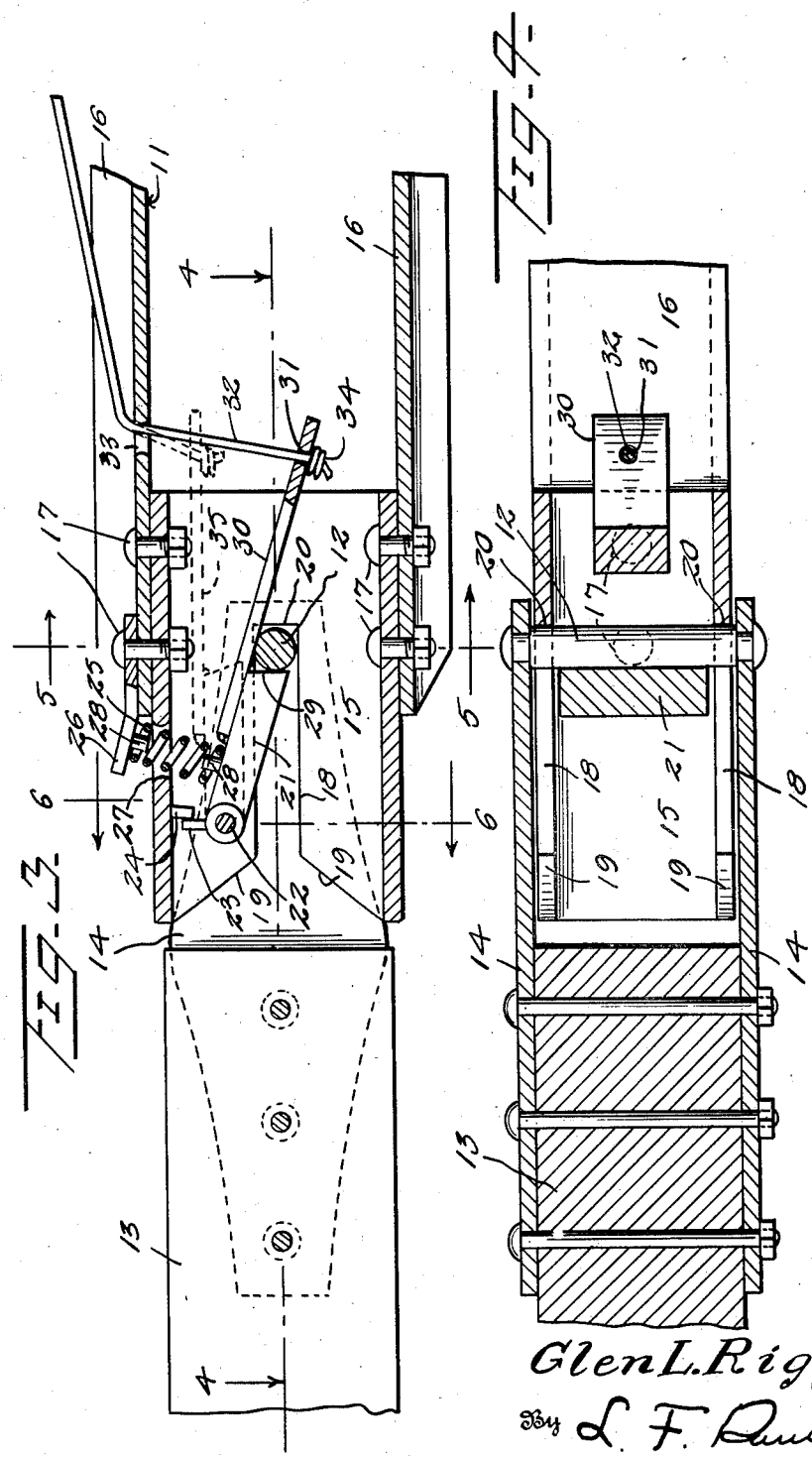
Inventor
Glen L. Riggins
By L. F. Randolph
Attorney Patented May 20, 1947

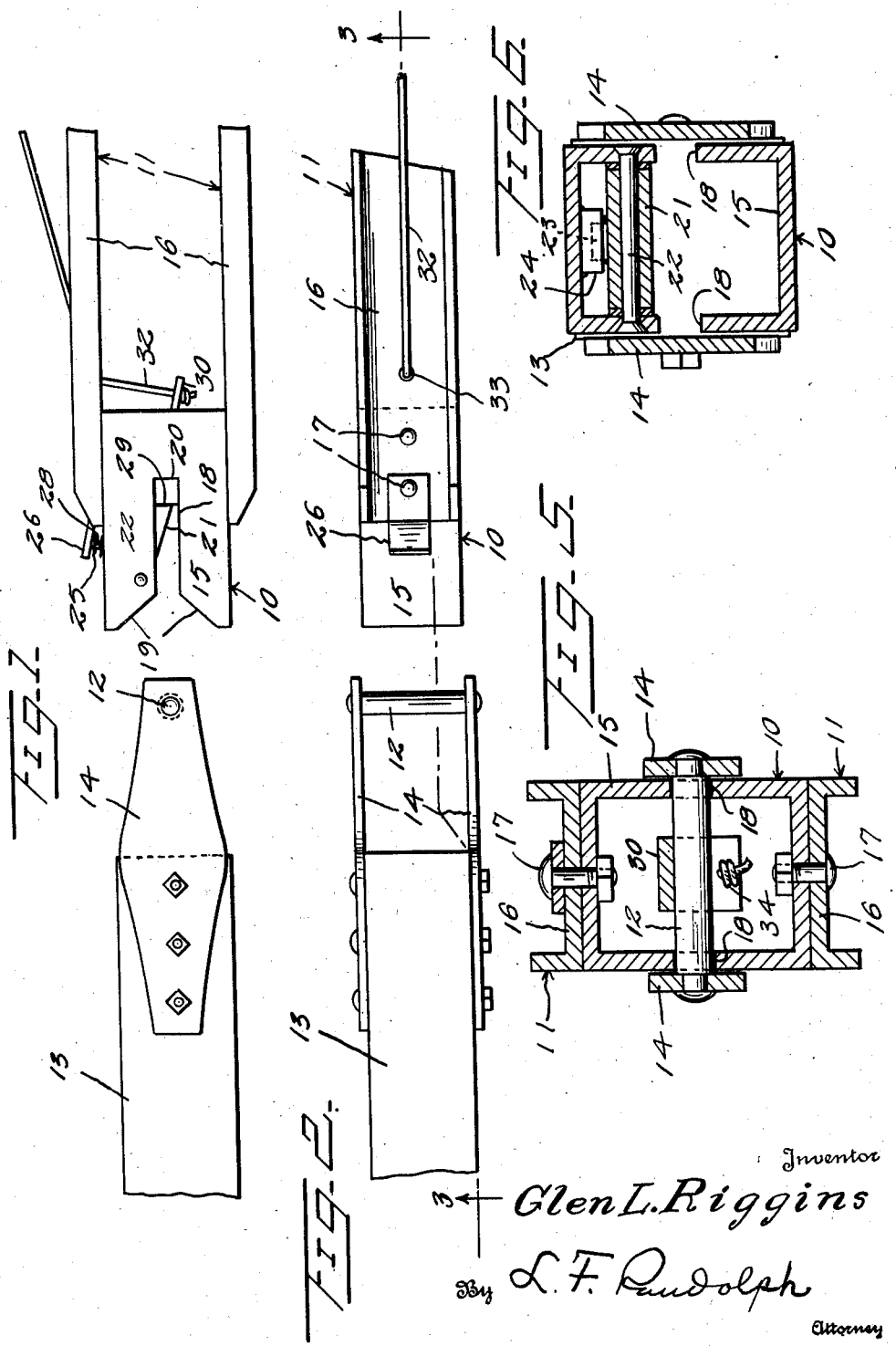

2,420,725

UNITED STATES PATENT OFFICE 2,420,725

COUPLING

Glen L. Riggins, Greene, Iowa

Application August 11, 1944, Serial No. 549,076

5 Claims. (Cl. 280—33.15)

This invention relates generally to coupling devices for vehicles and contemplates a coupling or hitch in which the coupling and uncoupling operations between the vehicles may be accomplished from the operator's station on the traction vehicle, thereby to expedite such operations and provide a time-saving arrangement.

Another object of the invention is to provide a hitch which permits vertical movement only at the coupling whereby a backing-up operation of the coupled vehicles may be accomplished and sufficient flexibility is afforded in a vertical direction to facilitate movement through a ditch or over undulating ground.

A further object of the invention is the provision of a latch for the coupling, which latch is inherently more rugged and stronger than the latches of the prior art coupling devices and better adapted to resist bending, shearing, or wearing of the parts in use thereof.

An additional object resides in the provision of a latch which is pivotally supported in the coupling in such a manner that the pull exerted on the latch by the towed vehicle promotes a self-locking action of the latch or urges the latch into a locked position, thereby to insure a positive connection between the coupled vehicles.

Still other objects and advantages of the invention not specifically stated hereinabove are those inherent in or implied from the novel combination and arrangement of parts as will become more clearly apparent from a consideration of the following description, reference being had to the accompanying drawings in which:

Figure 1 is a side elevation of a coupling constructed according to a preferred embodiment of the invention and shows the coupling secured to the drawbar of a tractor and in a position for coupling the tractor to the tongue of a wagon, Figure 2 is a plan view of the parts shown in Figure 1, Figure 3 is a sectional view taken substantially along the line 3—3 of Figure 2, Figure 4 is a sectional view taken along the line 4—4 of Figure 3.

Figure 5 is a sectional view taken along the line 5—5 of Figure 3, and

Figure 6 is a sectional view taken along the line 6—6 of Figure 3.

Referring now to the drawings for a more detailed description of the invention, the numeral 10 generally designates a coupling which may be advantageously employed for use on pleasure and business vehicles and trailers therefor, various types of agricultural machinery, and other kinds of vehicles, but which is particularly adapted for use with corn pickers and wagons drawn thereby.

The coupling or hitch 10 is carried by the drawbar, generally designated 11, of the corn picker or tractor and is adapted to engage in locked relation therewith the pin 12 carried by the tongue 13 of the wagon, the pin being riveted or otherwise rigidly secured to plates 14 which may be bolted or otherwise secured to the tongue in any conventional manner.

The hitch 10 comprises a tubular member 15 of rectangular cross section to which channel members 16 comprising the drawbar 11 are secured as by a suitable number of bolts and screws therefor generally designated 17. The tubular member 15 is bifurcated a substantial portion of the length thereof to form slots 18 on opposite sides of the member for receiving the tongue pin 12 well into the coupling, the member 10 being of such a width as to be slidably and snugly received between the plates 14 of the tongue 13, as best appears in Figure 4. The entrance to the slots 18 preferably are flared as at 19 to facilitate the entrance of the pin 12 into the slots during the coupling operation.

The tongue pin 12 is releasably retained adjacent the inner ends 20 of the slots 18 when the hitch is in a coupled condition by means of a latch 21 which is pivotally secured to the member 15 by means of a pin 22. Pin 22 preferably is riveted flush with the sides of member 15, as clearly appears in Figure 6, in order to clear the plates 41 at the sides thereof.

The latch 21 has an abutment or stop 23 which is yieldably urged into engagement with a coacting stop member 24 secured to the member 15 by means of a coil spring 25 disposed between the latch and a stop plate 26 secured to member 15 as by one or more of the bolts 17, the coil spring being admitted into member 15 through a suitable opening 27 formed therein and seated in position on the latch and plate 26 by means of pins or dowells 28 carried thereby.

In this position of the latch, the free end 29 thereof extends between the slots 18 and preferably is formed generally diagonally of the latch such that the end surface lies in a plane perpendicular to the slots and parallel to the ends 20 thereof. In order to swing the latch out of this position, a lever 30, which is welded or otherwise secured thereto is employed. Lever 30 extends outwardly of member 15 and is provided with an aperture 31 at the free end thereof for receiving a rope or cable 32 which extends through a suitable opening 33 in the upper channel member 16 and thence to the operator's station on the corn picker or tractor, the rope being knotted at 34 or otherwise secured to the lever.

In operation, assuming the corn picker and wagon to be positioned such that the drawbar and wagon tongue occupy the relative positions as shown in Figures 1 and 2, as the corn picker is backed up, the draw bar is moved in the direction of the tongue and the pin 12 thereof enters the slots 18, being guided therein along the flared surfaces 19. As the latch 21 engages the pin 12, the latch is yieldably pivoted about the pin 21 until the pin 12 moves adjacent the ends 20 of the slots 18, whereupon the latch snaps in place behind the pin 12 under power of spring 25 thus completing the coupling operation.

As the corn picker moves forward, the wagon towed thereby produces a force on the latch by way of the tongue pin, which force urges the latch in a clockwise direction as viewed in Figure 3, thus maintaining and urging the latch in the coupled or locked position thereof as the load is applied thereto. This action follows by reason of the disposition of the pin 22 above the slots 18 whereby an effective torque arm determined by the distance between the center of the pin 22 and the center of the slots results. The length of the torque arm is effectively increased by the perpendicular disposition of the end surface 29 of the latch whereby the line of contact between the pin 12 and the latch lies in the plane disposed centrally of the slots 18. The axis of rotation of the latch, however, is sufficiently near the slots 18 such that the stresses and strains on the latch as a result of the tow load thereon are substantially entirely compressional. Accordingly, the construction of the latch is such as to render the same rugged and mechanically strong and durable and not subject to bending, shearing, and premature wearing of the parts as is usually encountered in the use of the hook-shaped type of latches of the prior art devices.

As the vehicles move along undulating ground, either the drawbar 11 or tongue 13 is free to pivot about the axis provided by the pin 12, and accordingly, the coupling 10 is free to assume different vertical positions as the vehicles assume different levels. By reason of the close fit between the plates 14 of the tongue 13 and the member 15 of the coupling 10, and the relatively long bifurcation of the member 15, the tongue and drawbar act as a unitary rigid structure or swinging drawbar with respect to movement horizontally thereof. Accordingly, the vehicles may be backed up without causing a buckling or jackknifing of the coupling therebetween.

In uncoupling the vehicles, rope 32 is pulled at the operator's station thereby causing the latch 21 to pivot into the dotted line position 35 thereof. With the latch held in this position, the traction vehicle is moved forward, thus completing the uncoupling operation.

From the foregoing it should now be apparent that a coupling has been provided which readily may be manufactured, is simple and rugged in construction, is reliable in operation, and affords time-saving operations in the use thereof. When used in corn picking machinery, for example, by reason of the fact that the operator need not leave his station on the traction vehicle in coupling or uncoupling the wagons thereto, sufficient time is saved in one day to pick upwards of three more acres of corn per day.

While the invention has been described in particularity with respect to an example thereof which gives satisfactory results, it will be apparent to those skilled in the art to which the invention appertains that the same is susceptible of additional embodiments, variations, and additions without departing from the spirit and scope of the invention as defined by the appended claims.

I claim as my invention:

1. In a coupling for vehicles, the combination with a tongue pin supported on spaced plates and comprising the tongue of one of said vehicles, of a tubular coupling member secured to the draw bar of the other of said vehicles and adapted slidably and snugly to be received between said plates, said tubular member having longitudinal slots formed in opposite sides thereof and extended substantially throughout the length thereof for receiving said tongue pin into a position adjacent the closed ends of said slots, a substantially rectangularly shaped latch disposed within said member and adapted on one end thereof to engage said tongue pin in line contact therewith, means for pivotally supporting said latch at its opposite, forward end on the tubular member for vertical swinging movement as a lever of the second class about an axis disposed laterally of the slots and adjacent the open ends thereof, means for releasably maintaining the latch in line contact with the tongue pin, and means connected directly to said latch and operative from one of said vehicles for raising the latch out of engagement with the tongue pin whereby the pin may be removed from the tubular member upon movement of the vehicles with respect to each other.

2. In a coupling for vehicles, the combination with a tongue pin supported on horizontally spaced plates, of a tubular coupling member adapted to be received slidably and snugly between said plates and having longitudinal slots formed in opposite sides thereof and extended substantially throughout the length thereof for receiving said tongue pin into a position adjacent the closed ends of said slots, a substantially rectangularly shaped latch disposed within said tubular member and adapted on one end thereof abuttingly to engage said tongue pin in contact therewith along a line which lies in a plane disposed centrally of said slots, means for pivotally supporting said latch at its opposite, forward end on the tubular member for vertical swinging movement as a lever of the second class about an axis disposed laterally of the slots and adjacent the open ends thereof, and means engaging the latch intermediate of its ends for yieldably maintaining the latch in a position providing said line contact between the tongue pin and latch.

3. In a coupling for vehicles, the combination with a tongue pin, of a tubular coupling member having longitudinal slots formed in opposite sides thereof for receiving said tongue pin into a position adjacent the closed ends of said slots, said slots having flared openings to facilitate the entrance of the tongue pin thereinto, an elongated latch of substantially rectangular cross section adapted on one end thereof abuttingly to engage the tongue pin in line contact therewith, means for supporting said latch at its opposite, forward end on the tubular member for vertical swinging movement as a lever of the second class about an axis disposed laterally of the slots and adjacent the open ends thereof, means engaging the latch intermediate of its ends for yieldably maintaining the latch in said line contact with the tongue pin, and means operatively connected to the free end of the latch and manipulatable at a distance from the coupling member for raising the latch out of contact with the tongue pin.

4. A coupling adapted slidably to receive a tongue pin in releasably lockable engagement therewith comprising, in combination, a bifurcated tubular member adapted to receive said pin into the bifurcations thereof, a latch disposed within said member for releasably locking the pin against movement thereof outwardly of the bifurcations, horizontal means for pivotally supporting said latch on said member as a lever of the second class in such a manner as to urge the latch into said locking position thereof when the pin is urged in a direction against the latch, and means for yieldably retaining the latch in said locking position thereof.

5. A coupling adapted slidably to receive a tongue pin in releasably lockable engagement therewith comprising, in combination, a bifurcated tubular member adapted to receive said pin into the bifurcations thereof, a latch disposed within said member for releasably locking the pin against movement thereof outwardly of the bifurcations, horizontal means for pivotally supporting said latch on said member as a lever of the second class in such a manner as to urge the latch into said locking position thereof when the pin is urged in a direction against the latch, means for yieldably retaining the latch in said locking position thereof, and means operatively connected to said latch and adapted to be manipulated externally of the tubular member for raising the latch out of the locking position thereof.

GLEN L. RIGGINS.

REFERENCES CITED

The following references are of record in the file of this patent:

UNITED STATES PATENTS

| Number | Name | Date |
|---|---|---|
| 790,221 | McCune | May 16, 1905 |
| 860,763 | Olsen | July 23, 1907 |

FOREIGN PATENTS

| Number | Country | Date |
|---|---|---|
| 366,352 | Great Britain | Feb. 4, 1932 |